United States Patent
Chow

(10) Patent No.: US 11,254,311 B2
(45) Date of Patent: Feb. 22, 2022

(54) LATERAL ADAPTIVE CRUISE CONTROL

(71) Applicant: Toyota Motor Engineering & Manufacturing North America, Inc., Plano, TX (US)

(72) Inventor: Justin J. Chow, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 192 days.

(21) Appl. No.: 16/177,225

(22) Filed: Oct. 31, 2018

(65) Prior Publication Data

US 2020/0130690 A1 Apr. 30, 2020

(51) Int. Cl.
*B60W 30/16* (2020.01)
*B60W 30/09* (2012.01)
*B60W 30/095* (2012.01)

(52) U.S. Cl.
CPC .......... *B60W 30/162* (2013.01); *B60W 30/09* (2013.01); *B60W 30/0956* (2013.01); *B60W 2554/801* (2020.02); *B60W 2554/803* (2020.02); *B60W 2554/804* (2020.02)

(58) Field of Classification Search
CPC .. B60W 30/01; B60W 30/143; B60W 30/146; B60W 30/16; B60W 30/162; B60W 30/09; B60W 30/0956; B60W 2554/80; B60W 2554/801; B60W 2554/802; B60W 2554/803; B60W 2554/804; B60W 2555/60; B60W 40/109; B60W 2554/404; B60W 2554/4043; B60W 2554/4044; B60W 2554/4045; B60W 2520/12; B60W 2520/125

See application file for complete search history.

(56) References Cited

U.S. PATENT DOCUMENTS

| | | | |
|---|---|---|---|
| 5,959,552 | A | 9/1999 | Cho |
| 6,081,762 | A | 6/2000 | Richardson et al. |
| 6,335,681 | B1 | 1/2002 | Ontiveros et al. |
| 6,580,996 | B1 | 6/2003 | Friedrich |
| 7,424,357 | B2 * | 9/2008 | Ozaki ...................... G08G 1/04 701/70 |
| 7,512,475 | B2 | 3/2009 | Perisho, Jr. et al. |
| 8,068,968 | B2 * | 11/2011 | Kondoh ................ B60W 40/08 701/96 |

(Continued)

FOREIGN PATENT DOCUMENTS

WO WO 2004/080745 9/2004

*Primary Examiner* — Ig T An
(74) *Attorney, Agent, or Firm* — Snell & Wilmer LLP

(57) ABSTRACT

A system for lateral adaptive cruise control for use in a vehicle includes a main body, a power source, and a brake. The system further includes an input device to receive an adaptive cruise control request. The system further includes an object sensor to detect lateral object data. The system further includes an ECU designed to determine a velocity of the lateral object or a relative distance to the lateral object based on the lateral object data, determine a lane entrance event corresponding to the lateral object traveling towards a current lane occupied by the main body based on the at least one of the velocity of the lateral object or the relative distance to the lateral object, and control at least one of the power source or the brake to adjust a current speed of the main body based on the lane entrance event.

17 Claims, 7 Drawing Sheets

(56) References Cited

U.S. PATENT DOCUMENTS

| | | | |
|---|---|---|---|
| 8,229,644 | B2 | 7/2012 | Boecker et al. |
| 8,712,663 | B1 * | 4/2014 | Zeng ..................... B60W 30/16 |
| | | | 701/93 |
| 9,096,228 | B2 | 8/2015 | Stahlin et al. |
| 9,302,673 | B2 * | 4/2016 | Sakima ............... B60W 30/165 |
| 9,487,212 | B1 | 11/2016 | Adam et al. |
| 2013/0151058 | A1 * | 6/2013 | Zagorski ............... B60W 30/09 |
| | | | 701/23 |
| 2014/0297172 | A1 | 10/2014 | Huelsen |
| 2015/0100228 | A1 * | 4/2015 | Sudou ..................... G08G 1/16 |
| | | | 701/300 |
| 2017/0113664 | A1 * | 4/2017 | Nix .......................... B60T 7/12 |
| 2017/0355368 | A1 * | 12/2017 | O'Dea ............ B60W 30/18163 |
| 2017/0369067 | A1 * | 12/2017 | Saigusa ........... B60W 30/18163 |
| 2018/0118176 | A1 | 5/2018 | Lesher et al. |
| 2018/0284266 | A1 * | 10/2018 | Talamonti ............ G05D 1/0214 |

* cited by examiner

LATERAL ADAPTIVE CRUISE CONTROL

BACKGROUND

1. Field

The present disclosure relates to systems and methods for providing lateral adaptive cruise control that provides adaptive cruise control based on detected objects on multiple sides of a vehicle.

2. Description of the Related Art

Cruise control technology has been available in vehicles for many years. Conventional cruise control allows a driver to depress a button at a certain speed, causing an electronic control unit (ECU) of the vehicle to control a power source to cause the vehicle to remain at the certain speed without driver input. Various implementations of conventional cruise control allow a driver to provide additional input corresponding to a request to increase or decrease the speed of the vehicle without depressing an accelerator or brake pedal.

Recently, adaptive cruise control technology has become available. Adaptive cruise control technology uses a radar sensor on a front of the vehicle to detect a distance between the vehicle and a leading vehicle. Based on this detected distance, the ECU of the vehicle may control the speed of the vehicle to decrease in order to maintain a safe distance from the leading vehicle.

However, both conventional cruise control and adaptive cruise control technologies have drawbacks. Conventional cruise control has the drawback of lacking any feedback regarding the vehicle speed other than that provided directly by the driver. Similarly, adaptive cruise control only considers objects in front of the vehicle as feedback, failing to account for any objects on the sides or behind the vehicle.

In that regard, systems and methods for providing lateral adaptive cruise control technologies are desirable.

SUMMARY

Described herein is a system for lateral adaptive cruise control for use in a vehicle. The system includes a main body designed to support at least one driver. The system further includes a power source designed to generate power to propel the main body along a roadway. The system further includes a brake designed to apply a braking force to the main body or the wheels. The system further includes an input device designed to receive an adaptive cruise control request corresponding to a request for the vehicle to operate in an adaptive cruise control mode. The system further includes an object sensor located on the main body and designed to detect lateral object data including data corresponding to at least one of a velocity of a lateral object or a relative distance to the lateral object, the lateral object being located at a lateral location relative to the main body. The system further includes an electronic control unit (ECU) coupled to the power source, the input device, and the object sensor. The ECU is designed to determine the at least one of the velocity of the lateral object or the relative distance to the lateral object based on the lateral object data. The ECU is further designed to determine a lane entrance event corresponding to the lateral object traveling towards a current lane occupied by the main body based on the at least one of the velocity of the lateral object or the relative distance to the lateral object. The ECU is further designed to control at least one of the power source or the brake to adjust a current speed of the main body based on the lane entrance event.

Also disclosed is another system for lateral adaptive cruise control for use in a vehicle. The system includes a main body designed to support at least one driver. The system further includes a power source designed to generate power to propel the main body along a roadway. The system further includes a brake designed to apply a braking force to the main body or the wheels. The system further includes an input device designed to receive an adaptive cruise control request corresponding to a request for the vehicle to operate in an adaptive cruise control mode. The system further includes an object sensor located on the main body and designed to detect lateral object data including data corresponding to at least one of a velocity of a lateral object or a relative distance to the lateral object, the lateral object being located at a lateral location relative to the main body. The system further includes an electronic control unit (ECU) coupled to the power source, the input device, and the object sensor. The ECU is designed to determine the at least one of the velocity of the lateral object or the relative distance to the lateral object based on the lateral object data. The ECU is further designed to determine a lane change event corresponding to the main body being controlled to travel into a second lane adjacent to a current lane of the main body. The ECU is further designed to control at least one of the power source or the brake to adjust a current speed of the main body based on the lane change event and the at least one of the velocity of the lateral object or the relative distance to the lateral object.

Also disclosed is a method for lateral adaptive cruise control for use in a vehicle. The method includes receiving, by an input device, an adaptive cruise control request corresponding to a request for the vehicle to operate in an adaptive cruise control mode. The method further includes detecting, by an object sensor located on a main body, lateral object data including data corresponding to at least one of a velocity of a lateral object or a relative distance to the lateral object, the lateral object being located at a lateral location relative to the main body. The method further includes determining, by an electronic control unit (ECU), the at least one of the velocity of the lateral object or the relative distance to the lateral object based on the lateral object data. The method further includes determining, by the ECU, a lane entrance event corresponding to the lateral object traveling towards a current lane occupied by the main body based on the at least one of the velocity of the lateral object or the relative distance to the lateral object. The method further includes controlling, by the ECU, at least one of a power source or a brake to adjust a current speed of the main body based on the lane entrance event.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for providing lateral adaptive cruise control in a vehicle. The systems and methods provide several benefits and advantages such as providing an adaptive cruise control system that takes into account data detected on all sides of the vehicle. This provides the benefit of allowing the vehicle to safely avoid accidents or collisions in situations in which the vehicle is merging into another lane, another vehicle is merging into a lane occupied by the vehicle, another vehicle is tailgating the vehicle, another vehicle is laterally too close to the vehicle, another vehicle is in the blind spot of the vehicle, another object (such as an animal) is traveling into a lane occupied by the vehicle, etc. The systems provides additional benefits and advantages such as controlling a vehicle speed to reduce the likelihood of another vehicle traveling in a blind spot of a driver. This again provides the benefit of reducing the likelihood of accidents or collisions. The systems provide further benefits and advantages such as reducing the likelihood of the vehicle traveling above a posted speed limit, advantageously reducing the likelihood of a driver receiving a speeding ticket, and further reducing the likelihood of dangerous accidents or collisions.

An exemplary system includes a main body propelled by a power source and decelerated by a brake. The system further includes an input device designed to receive user input requesting that lateral adaptive cruise control be initiated. The system also includes one or more sensors designed to detect lateral object data corresponding to objects (e.g., another vehicle) on one or both sides of the main body. The system also includes an electronic control unit (ECU). The ECU may determine data corresponding to the lateral object such as a velocity or orientation of the lateral object, a distance to the lateral object, or the like. The ECU may further determine whether the main body is merging into an adjacent lane, or whether the lateral object is traveling into a lane occupied by the main body. Based on these determinations, the ECU may control the power source or the brake to increase or decrease the velocity of the main body to reduce the likelihood of an accident or a collision with the lateral object.

Figure 1:
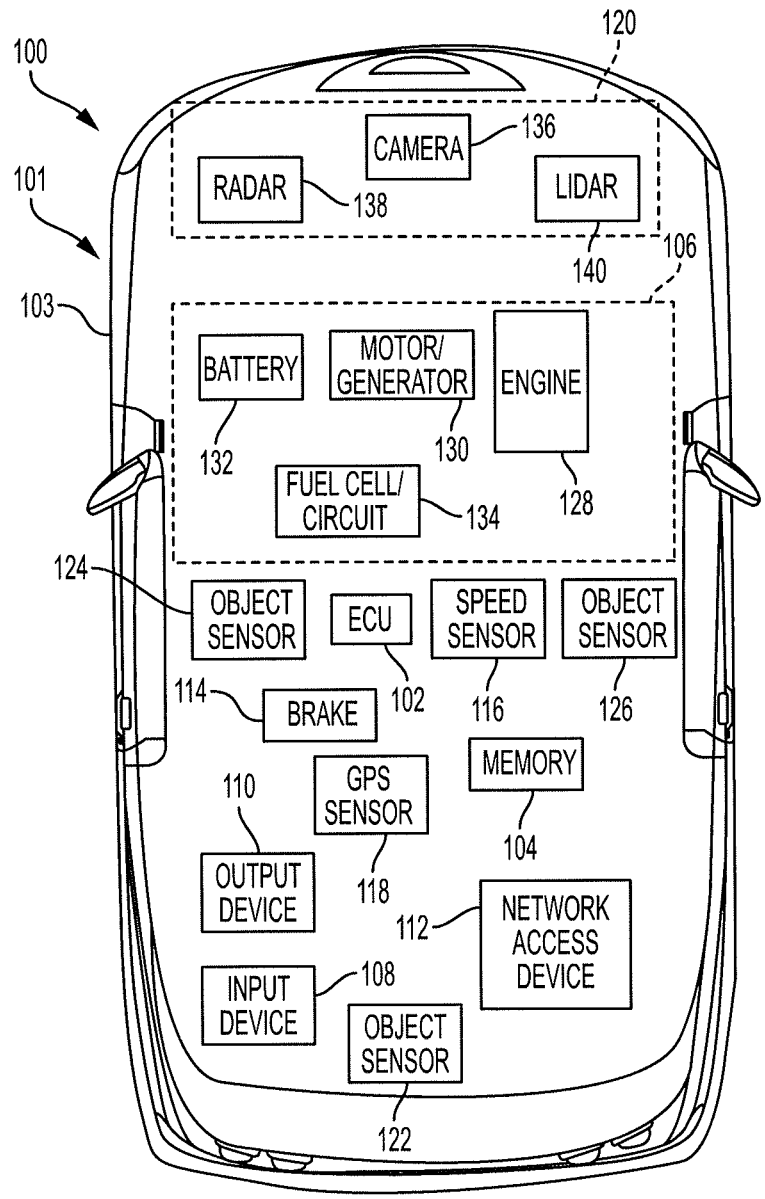
FIG. 1 is a block diagram illustrating a vehicle that includes a system for providing lateral adaptive cruise control technology according to an embodiment of the present invention.

Turning to FIG. 1, a vehicle 100 includes a system 101 for providing lateral adaptive cruise control of the vehicle 100. The vehicle 100 (or system 101) may include a main body 103, an ECU 102, a memory 104, and a power source 106. The vehicle 100 (or system 101) may further include an input device 108, an output device 110, a network access device 112, a brake 114, and a plurality of sensors 118-126. The sensors may include a speed sensor 116, a global positioning system (GPS) sensor 118, and a plurality of object sensors 120, 122, 124, 126.

The main body 103 may be propelled along a roadway, may be suspended in or on water, or may fly through air. The main body 103 may resemble a vehicle such as a car, a motorcycle, a boat, an aircraft, or the like. The main body 103 may further support an individual such as a driver, a passenger, or the like.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operations of components based on the determinations.

The vehicle 100 may be fully autonomous or semi-autonomous. In that regard, the ECU 102 may control various aspects of the vehicle 100 (such as steering, braking, accelerating, or the like) to maneuver the vehicle 100 from a starting location to a destination.

The memory 104 may include any non-transitory memory and may be capable of storing data usable by the ECU 102. For example, the memory 104 may store instructions usable by the ECU 102 to navigate the vehicle 100 from a starting location to a destination, control the power source 106 and brake 114, or the like.

The power source 106 may include any one or more of an engine 128, a motor-generator 130, a battery 132, or a fuel-cell circuit 134. The engine 128 may convert a fuel into mechanical power for propelling the vehicle 100. In that regard, the engine 128 may be a gasoline engine, a diesel engine, or the like.

The battery 132 may store electrical energy. In some embodiments, the battery 132 may include any one or more energy storage device including a battery, a flywheel, a super capacitor, a thermal storage device, or the like.

The fuel-cell circuit 134 may include a plurality of fuel cells that facilitate a chemical reaction to generate electrical energy. For example, the fuel cells may receive hydrogen and oxygen, facilitate a reaction between the hydrogen and the oxygen, and output electricity in response to the reaction. In that regard, the electrical energy generated by the fuel-cell circuit 134 may be stored in the battery 132 and/or used by the motor-generator 130. In some embodiments, the vehicle 100 may include multiple fuel-cell circuits including the fuel-cell circuit 134.

The motor-generator 130 may convert the electrical energy stored in the battery 132 (or the electrical energy received directly from the fuel-cell circuit 134) into mechanical power usable to propel the vehicle 100. The motor-generator 130 may further convert mechanical power received from the engine 128 or from wheels of the vehicle 100 into electricity, which may be stored in the battery 132 as energy and/or used by other components of the vehicle 100. In some embodiments, the motor-generator 130 may include a motor without a generator portion and, in some embodiments, a separate generator may be provided.

The input device 108 may include any input device capable of receiving user input. For example, the input device 108 may include a touchscreen, a keyboard, a mouse, a microphone, or the like. The input device 108 may include multiple input devices that may receive user input in a variety of manners. For example, the input device 108 may include an accelerator pedal that receives user input corresponding to a request to accelerate the vehicle 100, a brake pedal that receives user input corresponding to a request for the brake 114 to apply a braking force to the vehicle, a button or other input device that receives user input requesting adaptive cruise control, or the like.

The output device 110 may include any output device such as a display, a speaker, a touchscreen, or the like. The ECU 102 may control the output device 110 to output data such as a request for a driver to take over acceleration and braking control, or the like.

The network access device 112 may communicate with a remote device such as a mobile device associated with a user, nearby vehicles, or the like. The network access device 112 may communicate via any wired or wireless communication protocol such as Bluetooth, Wi-Fi, vehicle to vehicle communication protocols (V2V), or the like. For example, the network access device 112 may receive a pickup request from a driver or a rider and the ECU 102 may control the power source 106 to maneuver the main body 103 to a location to pick up the driver or the rider. As another example, the network access device 112 may communicate with a vehicle within the vicinity of the main body 103 to identify a location of the vehicle (such as GPS coordinates or a relative distance to the main body 103), a speed or a velocity of the vehicle, or the like.

The brake 114 may include any type of vehicle brake such as a disk brake system, friction brakes, air brakes, or the like. The brake 114 may be controlled by the ECU 102 to apply a braking force to the main body 103 in order to decelerate the main body 103. For example, the ECU 102 may determine how much braking force to be applied by the brake 114, a user may provide user input via the input device 108 that identifies the amount of braking force, or the like.

The speed sensor 116 may include any speed sensor or speedometer capable of detecting or determining a speed or a velocity of the main body 103 relative to a ground surface. In some embodiments, the functionality of the speed sensor may be performed by the ECU 102 such as by performing a calculation based on a grade of a current roadway, an amount of power provided by the power source 106, a rotational velocity of one or more of the engine 128 or the motor generator 130, data received from an inertial measurement unit (IMU), or the like.

The GPS sensor 118 may include a GPS sensor, an IMU, or other position sensor that detects data usable to determine a current location of the main body 103. The current location may be used by the ECU 102, for example, by comparing the current location to a map stored in the memory 104 to determine a speed limit of a current roadway. As yet another example, the ECU 102 may control the network access device 112 to transmit the current location of the main body 103 to a remote server, and the remote server may transmit the speed limit of the current roadway back to the ECU 102 via the network access device 112.

Each of the object sensors 120, 122, 124, 126 may include a camera 136, a radar sensor 138, a light detection and ranging (LIDAR) sensor 140, or any other proximity or distance sensor. The object sensors 120, 122, 124, 126 may detect data corresponding to objects within a predetermined distance of the main body of 103. The predetermined distance may correspond to a distance within which it is determined that information corresponding to the object may affect driving of the vehicle 100. For example, the data may include a relative distance from the main body 103 to an object, a velocity of the object relative to a ground surface, a velocity of the object relative to the main body 103, a size of the object, or the like.

The object sensor 120 may detect object data in front of the vehicle 100 and to either side of the vehicle 100. The object sensor 122 may detect object data behind the vehicle 100 and to either side of the vehicle 100. The object sensor 124 may detect object data to the left of the vehicle 100 and to the front and back of the vehicle 100. The object sensor 126 may detect object data to the right of the vehicle 100 and to the front and back of the vehicle 100.

In some embodiments, a vehicle may include a single object sensor mounted on or embedded into a roof of the vehicle that is capable of detecting object data on all four sides of the vehicle. In some embodiments, a vehicle may include more than four object sensors placed strategically about a perimeter of the vehicle or integrated into the vehicle's body. In some embodiments, a vehicle may include multiple types of object sensors in multiple locations such as a radar sensor and a camera mounted on each of the front, the back, and both sides of the vehicle.

The vehicle 100 may be capable of providing lateral adaptive cruise control. In that regard, as a driver is driving the vehicle 100, the driver may wish for the ECU 102 to provide adaptive cruise control. The driver may provide this request via the input device 108 such as by pressing a button that corresponds to a cruise control request, selecting an area of a touchscreen that corresponds to a cruise control request, or the like. The ECU 102 may receive the object data from the object sensors 120, 122, 124, 126 and may control acceleration and braking of the vehicle based on the received cruise control request and the object data.

For example, the driver may depress a cruise control input button as the user is driving at a predetermined speed. The ECU 102 may control the power source 106 and the brake 114 to cause the main body 103 to remain at the predetermined speed. However, if the object data indicates that a collision may occur if the main body 103 remains at the predetermined speed then the ECU 102 may control the power source 106 or the brake 114 to accelerate or decelerate the vehicle. A driver may further use the input device 108 to increase or decrease the predetermined speed at which the ECU 102 will control the vehicle 100 to remain at.

For example, cruise control may be requested while the vehicle 100 is traveling at 50 miles per hour (mph). The ECU 102 may control the power source 106 and the brake 114 to cause the main body 103 to remain at 50 mph. After a period of time, the object sensor 120 may detect that the main body 103 is traveling 5 mph faster than a leading vehicle. Based on this determination, the ECU 102 may control the brake 114 to decelerate the main body 103 to travel at 45 mph.

As another example illustrating the lateral aspect of the lateral adaptive cruise control, the object sensor 126 may include a camera that detects image data that indicates that a vehicle to the right of the main body 103 (a lateral object) has turned a left blinker on, indicating that the vehicle will merge into the lane occupied by the main body 103. Based on the object data, the ECU 102 may determine that the vehicle will merge into the lane occupied by the main body 103. The ECU 102 may further determine a velocity of the vehicle and a distance from the main body 103 to the vehicle. For example, the ECU 102 may determine that the vehicle is parallel with the main body 103 and is traveling 5 mph faster than the main body 103. Based on this information, the ECU 102 may control the brake 114 to decelerate the main body 103 to allow the other vehicle to safely merge into the lane occupied by the main body 103.

As yet another example, the object sensor 126 may detect the presence of an animal, such as a deer (a lateral object), running towards the lane occupied by the main body 103. The ECU 102 may receive the object data and determine that the deer is on a collision course with the main body 103. Based on this information, the ECU 102 may either control the power source 106 to accelerate the main body 103 to avoid the deer or control the brake 114 to decelerate the main body 103 to avoid the deer.

Figure 2A:
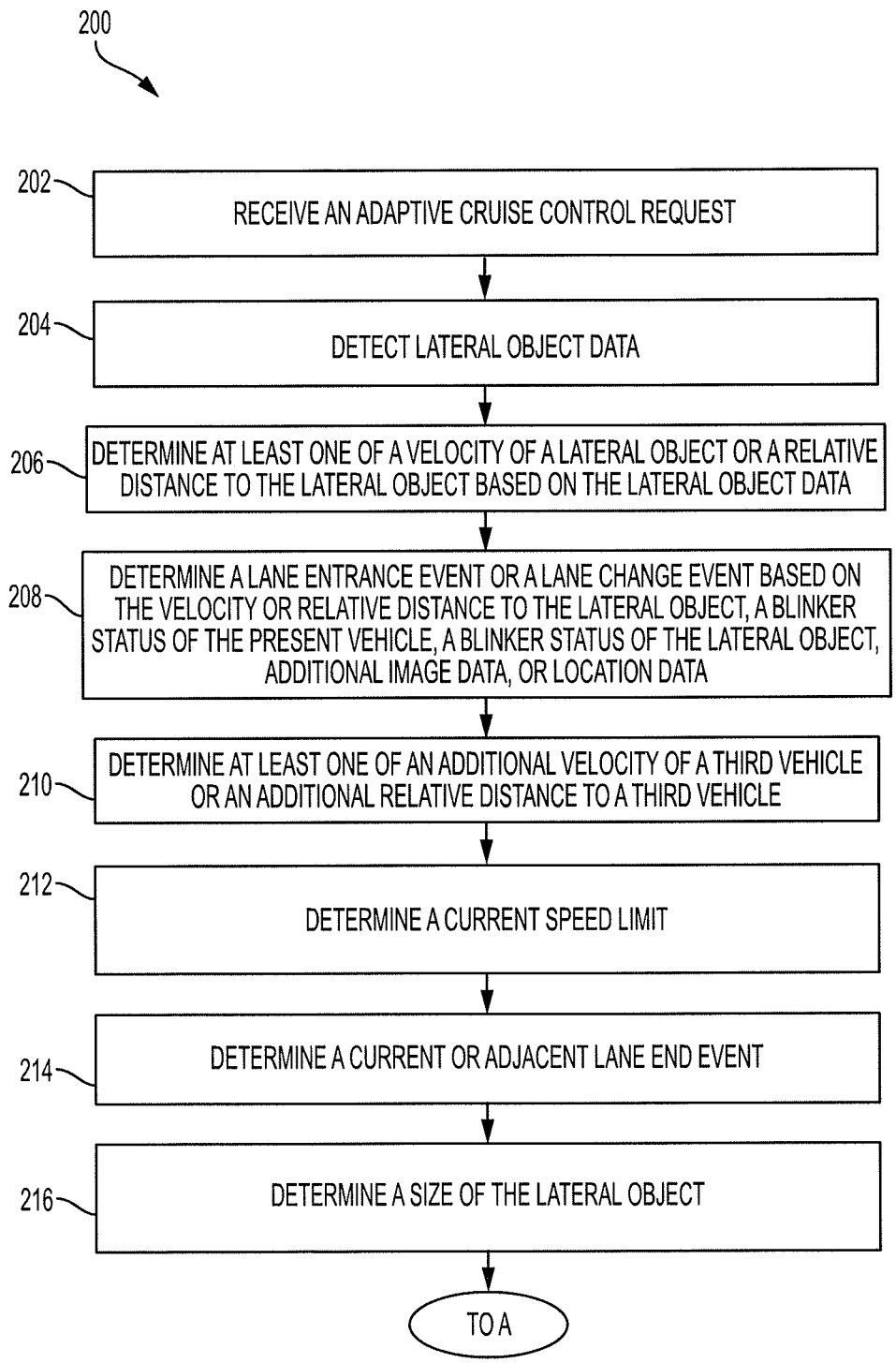
FIGS. 2A and 2B are flowcharts illustrating a method for providing lateral adaptive cruise control technology according to an embodiment of the present invention.
Figure 2B:
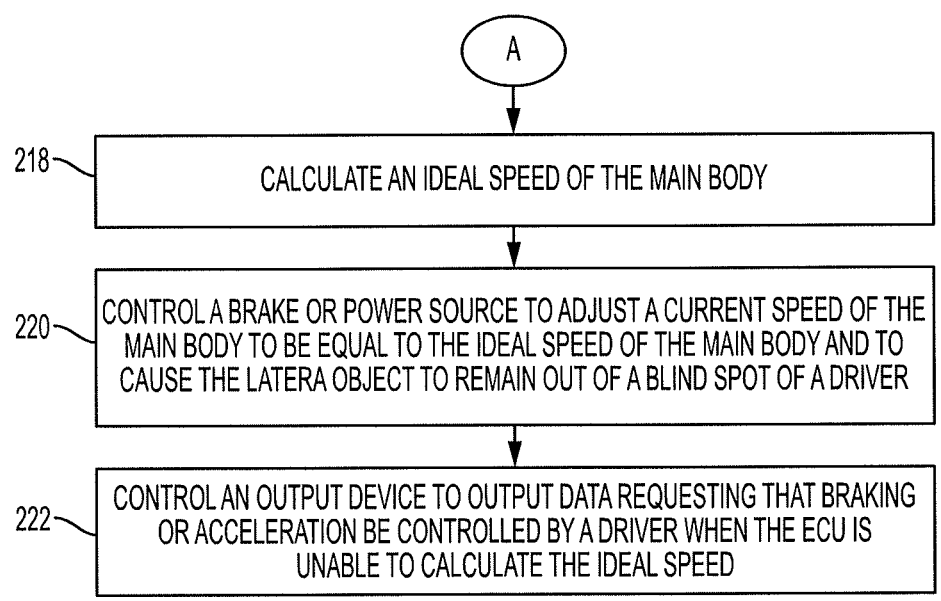

The ECU 102 may perform an algorithm or method to provide this lateral adaptive cruise control functionality. Referring now to FIGS. 2A and 2B, a method 200 for providing lateral adaptive cruise control is shown. The method 200 may be performed by components of a vehicle, such as the vehicle 100 of FIG. 1. As described above, the vehicle may be or may include a car, a bus, a truck, a motorcycle, a watercraft, or an aircraft.

In block 202, an input device may receive a request for the vehicle to provide lateral adaptive cruise control. For example, a user may depress a button that corresponds to a lateral adaptive cruise control request, may speak a command that corresponds to a lateral adaptive cruise control request, or the like. The input device may be coupled to an ECU, and the ECU may receive the lateral adaptive cruise control request from the input device.

In block 204, one or more object sensors of the vehicle may receive lateral object data. The lateral object data may correspond to a velocity of a lateral object (e.g., another vehicle), a distance from a main body to a lateral object, a relative location of a lateral object, or the like. Additionally, one or more object sensors may detect object data that corresponds to an object in front of the vehicle or behind the vehicle and may include similar information as the lateral object data. In that regard, the one or more object sensors may detect velocities of nearby objects, distances to nearby objects, relative locations of nearby objects, or the like.

In block 206, the ECU of the vehicle may determine data corresponding to the nearby objects, including any lateral objects, based on the object data. The determined data may include a velocity of the object, a velocity of the object relative to a velocity of the main body, a distance from the main body to the object, a direction of the object relative to the main body, a heading of the object, or the like. The data may further include information such as whether the object has a blinker that is turned on, a size of the object, an identification of the object (such as whether the object is another vehicle, a trailer, a baseball, or an animal), or the like.

In block 208, the ECU may determine a lane entrance event or a lane change event based on the determined data and other information received by the ECU. A lane entrance event may correspond to a determination by the ECU that a lateral object is traveling towards a current lane occupied by the main body. The lane entrance event may be determined based on the lateral object data, the determinations made in block 206, or the like.

For example, the ECU may receive object data that indicates that a blinker of a vehicle next to the main body (a lateral object) indicates that the vehicle will merge into the current lane occupied by the main body. The ECU may use this data to determine that a lane entrance event is likely. As another example, the ECU may receive object data indicating that a current path of an adjacent vehicle or an animal is headed towards a current path of the main body. The ECU may again use this data to determine that a lane entrance event is likely. The ECU may use this data to determine that a lane entrance event is likely. As yet another example, an ECU of a watercraft may determine that a whale is traveling towards a current path of the main body.

A lane change event may correspond to a determination by the ECU that the main body is traveling towards a current lane or path of a lateral object. The ECU may again make this determination based on the lateral object data, the determinations made in block 206, or the like.

For example, the ECU may receive data from an input device indicating that a blinker of the main body has been turned on, and may use this data to determine that a lane change event is likely. As another example, the ECU may determine that a current heading of the main body has changed such that the main body is traveling into an adjacent lane, and may use this data to determine that a lane change event is likely.

In block 210, the ECU may determine additional data corresponding to an additional object, such as a third vehicle or other object. The other object may be or may include another lateral object, an object in front of the main body, or an object behind the main body. The additional data may include, for example, a velocity of the other object, a relative distance from the main body to the other object, or the like. The ECU may determine this additional data based on object data detected from one or more object sensor. In some embodiments, the additional object data may be detected by the same object sensor that detected the lateral object data in block 204, or may be detected by a different object sensor. Any discussion of lateral objects may further apply to this additional object.

In block 212, the ECU may determine a current speed limit on a current road traveled by the main body. In some embodiments, the object sensor may include a camera capable of detecting image data corresponding to a speed limit sign, and the ECU may determine the current speed limit based on the image data. In some embodiments, a location sensor (such as a GPS sensor, an IMU sensor, or the like) may detect a current location of the main body and the ECU may compare the current location to map data (or may transmit the current location to a remote device) to determine (or receive) the current speed limit based on the current location.

In block 214, the ECU may determine a current or adjacent lane end event based on the detected data. A current lane end event may correspond to a determination that a current lane occupied by the main body will end, and an adjacent lane end event may correspond to a determination that a lane adjacent to the lane occupied by the main body (or another lane) will end. The ECU may make these determinations based on detected data.

For example, a camera may detect data corresponding to a road sign that indicates that a current or adjacent lane will end, corresponding to lane markers indicating that a current or adjacent lane will end, or the like. As another example, the ECU may transmit the current location of the main body to a remote device (such as a traffic server) and may receive back a notification indicating that a lane will end. Based on this information (and potentially other information such as an identification of a current lane of the main body), the ECU may determine a lane end event. As yet another example, the ECU may compare the current location to a memory that includes map data, and may determine a lane end event based on this comparison.

As another example, a camera may detect data that indicates that a current or adjacent lane will end. For example, the camera may detect an object (such as a cone, a fallen object (such as a branch), a pothole, or the like) in a lane. Any of this data may indicate that the lane with the object will come to an end. Based on this information, the ECU may determine a lane end event and may control the vehicle to move from the lane (or to avoid entering the lane) before the vehicle reaches the object.

In block 216, the ECU may determine a size of the lateral object. For example, the ECU may analyze the objects data (such as radar data, image data, LIDAR data, or the like) and determine the size of the lateral object based on this analysis. In some embodiments, the ECU may determine whether the lateral object is within one of multiple predetermined size categories (such as between 1 foot and 3 feet in height, between 3 feet and 5 feet in height, between 2 feet and 3 feet in width, between 3 feet and 4 feet in width, or the like). In some embodiments, the ECU may determine the actual size of the lateral object (such as 3 cubic feet, 6 feet in length by 5 feet in width by 3 feet in height, or 3 feet in length by 5 feet in height). In some embodiments, the ECU may identify a type of the lateral object. For example, the ECU may determine whether the lateral object is another vehicle, whether the lateral object is an animal, whether the lateral object is a bug, whether the lateral object is a drone, or the like.

In some embodiments, the ECU may determine a location of the lateral object relative to the roadway. For example, the ECU may determine that an object (such as a branch) is located sufficiently high above the roadway that the vehicle will avoid the object even if the vehicle remains in the current lane. As another example, the ECU may determine that an object (such as a bridge) is located sufficiently low to the roadway that the vehicle will avoid the object even if the vehicle remains in the current lane. In these situations, the ECU may control the vehicle normally (i.e., not avoiding the lane).

However, the ECU may determine that other objects (such as a construction arm) is located at a height relative to the roadway (or is moving into the roadway) in such a manner as to potentially create a collision with the vehicle. In that regard, the ECU may control the vehicle to avoid the lane in which the object is located (or traveling into).

In block 218, the ECU may calculate an ideal speed of the main body. The ECU may make this calculation based on any of the detected or determined data corresponding to the lateral objects and the additional objects. In some embodiments, the ideal speed may correspond to a specific vehicle speed. In some embodiments, the ideal speed may correspond to a determination to increase or decrease the current vehicle speed. In some embodiments, the ideal speed may correspond to a speed differential by which the ECU determines to increase or decrease the current vehicle speed.

For example, the ECU may determine a lane change event indicating that the main body will be merging into a lane on a right side of the main body. The ECU may further determine that a vehicle directly to the right of the main body is traveling the same speed as the main body. Based on this information, the ECU may determine that the current speed of the main body should decrease by 10 mph until the main body can safely merge into the lane on the right.

Continuing the example, the ECU may further determine that a third vehicle in front of the adjacent vehicle is traveling 5 mph slower than the adjacent vehicle. Based on this determination, the ECU may determine that the current speed of the main body should increase by 5 mph, allowing the main body to merge in front of the two vehicles.

However, in some embodiments, the ECU may determine to cause the current vehicle speed to remain at or below the current speed limit. In that regard, if the ECU determines that the current vehicle speed is equal to the current speed limit then the ECU may determine that the ideal speed of the main body is 15 mph less than the current vehicle speed to allow the main body to merge behind the adjacent vehicle.

As another example, the ECU may determine a lane entrance event indicating that a vehicle on the left of the main body (a lateral object) will be merging into the current lane of the main body. The ECU may further determine that a vehicle in front of the main body is traveling 5 mph faster than the main body. The ECU may also determine that a vehicle on the left of the main body is traveling 5 mph slower than the main body. Based on these determinations, the ECU may determine that the ideal speed of the main body is 5 mph greater than the current vehicle speed to allow the adjacent vehicle to safely merge into the current lane occupied by the main body.

As yet another example, the ECU may determine a lane end event indicating that the current lane occupied by the main body will be ending. The ECU may further determine that the only available lane is to the right of the main body, that a vehicle is located in the available lane adjacent to the main body, and that another vehicle is located immediately behind the adjacent vehicle. Based on these determinations, the ECU may determine that the ideal speed of the main body is 15 mph faster than the current speed so that the main body can safely merge in front of the two adjacent vehicles before the lane ends.

As yet another example, the ECU may determine that another vehicle is located adjacent to and slightly behind the main body. Based on this determination, the ECU may determine that the other vehicle is located in a blind spot of the driver such that the driver cannot easily see the other vehicle. The ECU may determine that the ideal speed of the main body is 5 mph greater than the current speed of the main body to cause the other vehicle to be located in an area outside of the blind spot of the driver.

As yet another example, the ECU may determine that a deer is running into the current roadway, and is on track to run into the main body. Based on this determination, the ECU may determine that the ideal speed of the main body is 5 mph greater than the current speed to cause the main body to reach a location in front of where the deer will end up. It may be desirable for the main body to increase in speed in this situation so that the animal fails to run into a location and front of the main body and stop running at that location.

As yet another example, the ECU may determine that a second boat is traveling in such a direction that it will intersect with the path of the main body of a present boat. Based on this determination, the ECU may determine that the ideal speed of the main body is 10 knots slower than the current speed of the main body to avoid a collision with the second boat.

In block 220, the ECU may control a brake of the vehicle or a power source of the vehicle to adjust the current speed of the main body to be equal to the ideal speed of the main body. This may reduce the likelihood of collision between the main body and a lateral or other object, as well as reduce the likelihood of lateral objects being located in a blind spot of the driver, further reducing the likelihood of collisions.

In various situations, the ECU may be unable to determine an ideal speed. For example, in heavy traffic situations, the ECU may be incapable of determining an ideal speed. In such situations, the ECU may control an output device of the vehicle to output data requesting that the driver take control of vehicle acceleration and braking in order to safely navigate the current situation.

In some embodiments, after the lane change or lane entrance has occurred, or the lateral object is out of the blind spot of the driver, the ECU may control the vehicle to return to its original speed, or another safe speed that is similar to the original or set speed. For example, after the ECU controls the vehicle to decelerate by 10 mph to allow a second vehicle to safely merge in front of the main body, the ECU may control the vehicle speed to again increase to its original or set speed, so long as it can do so without being located an unsafe distance from the leading vehicle.

Figure 3:
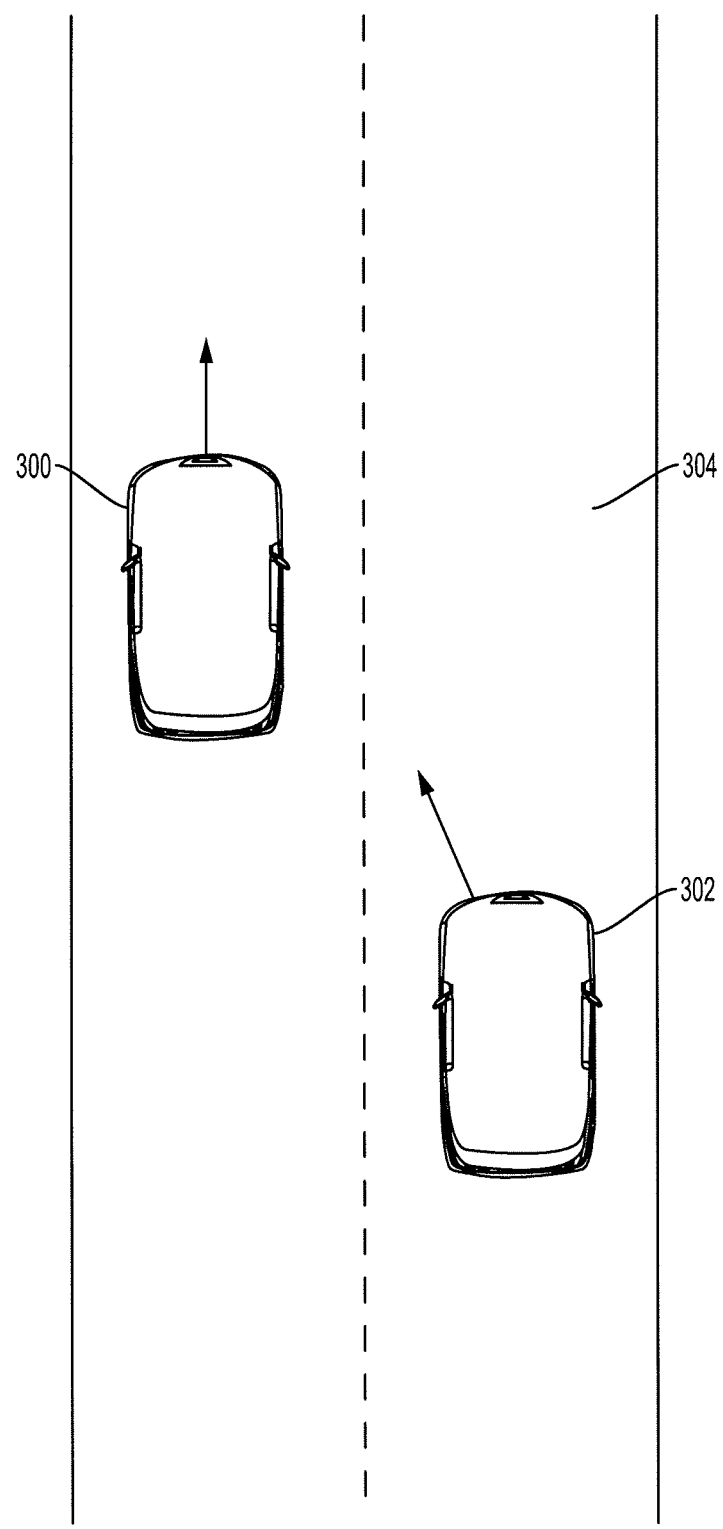
FIG. 3 is a drawing illustrating an exemplary implementation of the method of FIGS. 2A and 2B according to an embodiment of the present invention.

Referring now to FIG. 3, an exemplary implementation of the method 200 of FIGS. 2A and 2B is shown. In particular, a vehicle 300 may include lateral adaptive cruise control technology and may perform a method similar to the method 200 of FIGS. 2A and 2B. The vehicle 300 may be traveling along a road 304 at a speed that is 5 mph less than another vehicle 302 traveling in a lane to the right of the vehicle 300. Sensors of the vehicle 300 may detect object data indicating that the vehicle 302 is merging to the left, into a lane occupied by the vehicle 300.

Based on this detected data, an ECU of the vehicle 300 may determine that an ideal speed of the vehicle 300 is 10 mph greater than its current speed to allow for the vehicle 302 to safely merge into the current lane of the vehicle 300. The ECU may then control the vehicle 300 to accelerate to a vehicle speed that is 10 mph greater than its current speed.

Figure 4:
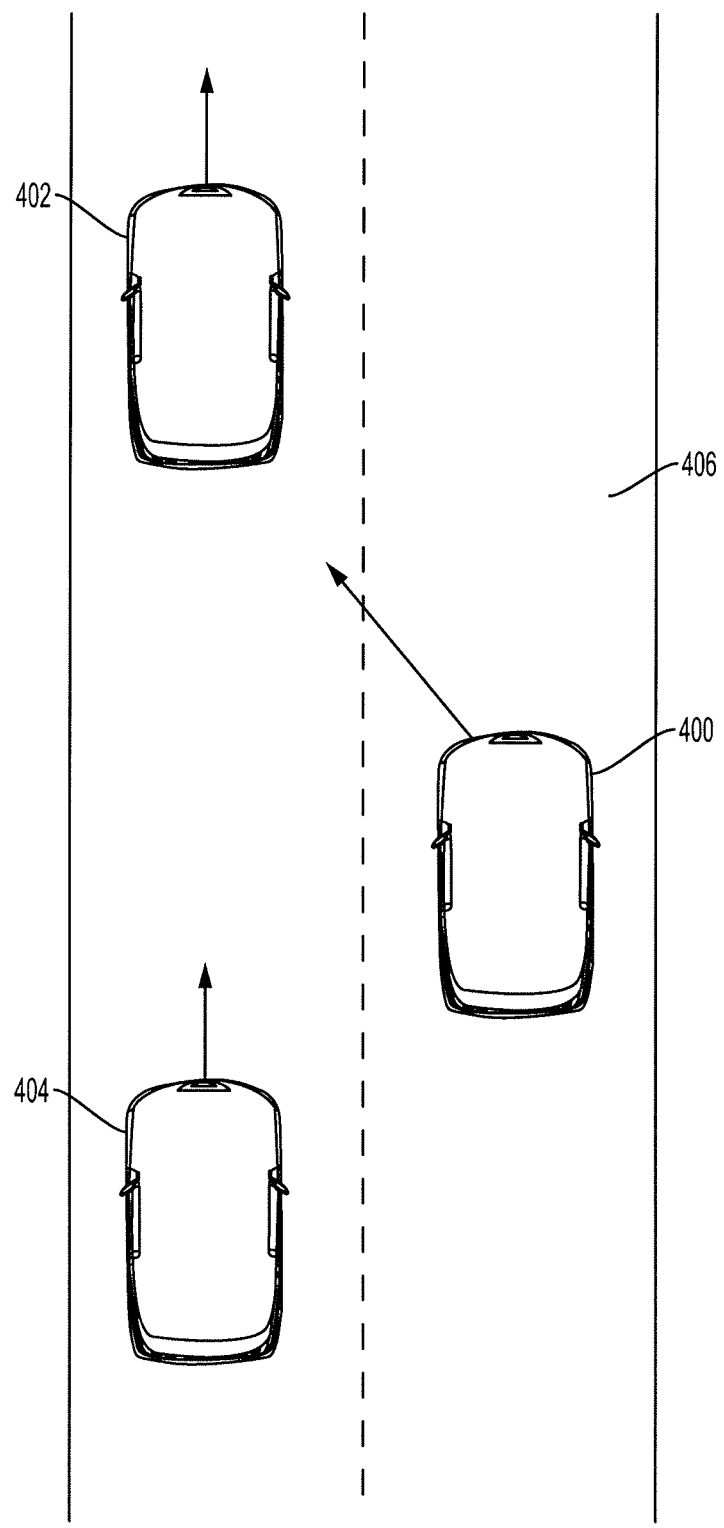
FIG. 4 is a drawing illustrating an exemplary implementation of the method of FIGS. 2A and 2B according to an embodiment of the present invention.

Referring now to FIG. 4, another exemplary implementation of the method 200 of FIGS. 2A and 2B is shown. In particular, a vehicle 400 may include lateral adaptive cruise control technology and may perform a method similar to the method 200 of FIGS. 2A and 2B. The vehicle 400 may be traveling along a road 406 at a speed that is equal to the speed of a second vehicle 402 and a third vehicle 404. The ECU may determine that the vehicle 400 is planning to merge to the left where the other two vehicles 402, 404 are located.

Based on these determinations, the ECU of the vehicle 400 may determine that an ideal speed of the vehicle 400 is 10 mph less than a current vehicle speed to allow the vehicle 400 to safely merge behind the vehicle 402 and the vehicle 404. The ECU may then control the brake or the power source of the vehicle 400 to reduce the vehicle speed to 10 mph less than the current vehicle speed.

Figure 5:
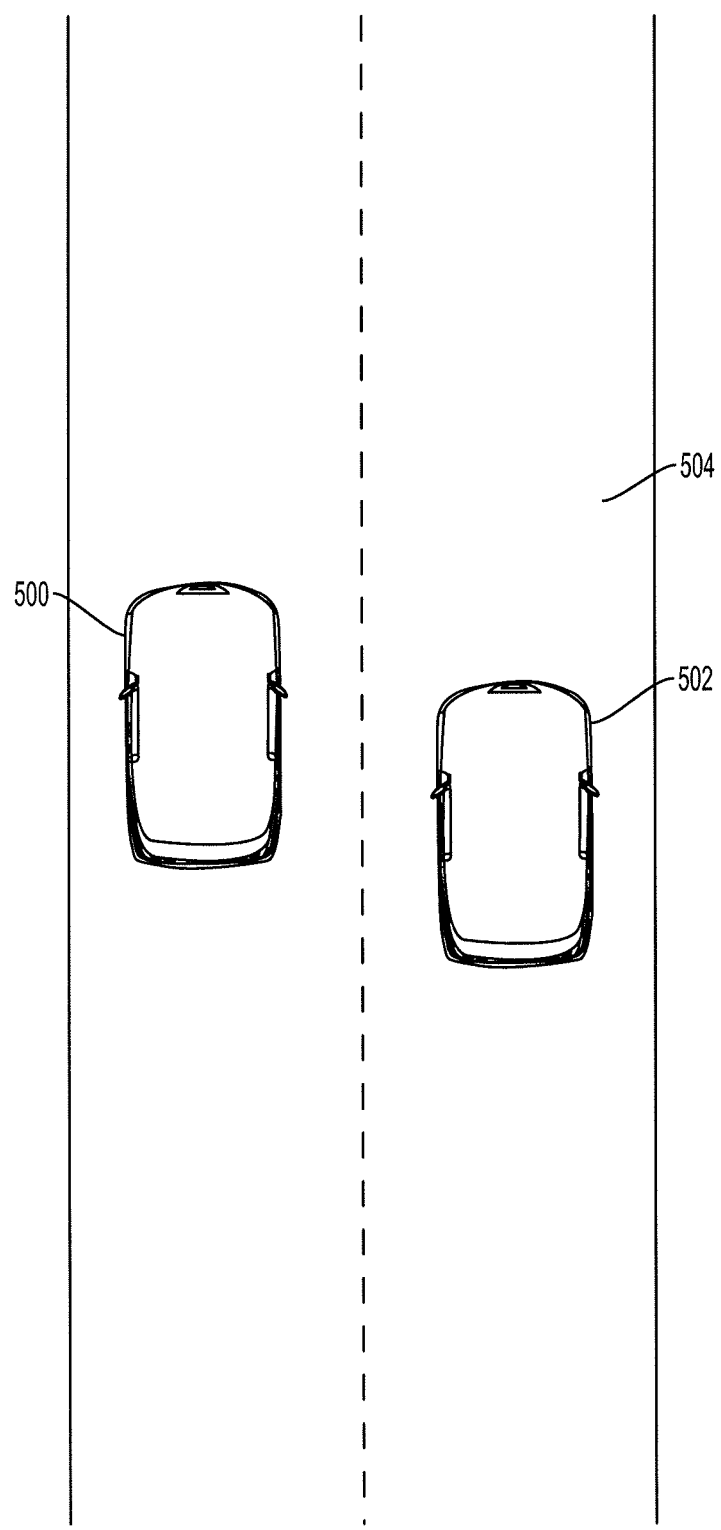
FIG. 5 is a drawing illustrating an exemplary implementation of the method of FIGS. 2A and 2B according to an embodiment of the present invention.

Referring now to FIG. 5, another exemplary implementation of the method 200 of FIGS. 2A and 2B is shown. In particular, a vehicle 500 may include lateral adaptive cruise control technology and may perform a method similar to the method 200 of FIGS. 2A and 2B. The vehicle 500 may be traveling along a road 504 at a speed that is equal to the speed of a second vehicle 402. The ECU may determine that the vehicle 502 is in a blind spot of a driver of the vehicle 500.

Based on these determinations, the ECU of the vehicle 500 may determine that an ideal speed of the vehicle 500 is 10 mph less than a current vehicle speed to allow the vehicle 502 to move away from the current blind spot of the driver of the vehicle 500. The ECU may then control the brake or the power source of the vehicle 600 to reduce the vehicle speed to 10 mph less than the current vehicle speed. Once the vehicle 502 is out of the blind spot of the driver, the ECU may control the speed of the vehicle 500 to increase by 10 mph to its original speed.

Figure 6:
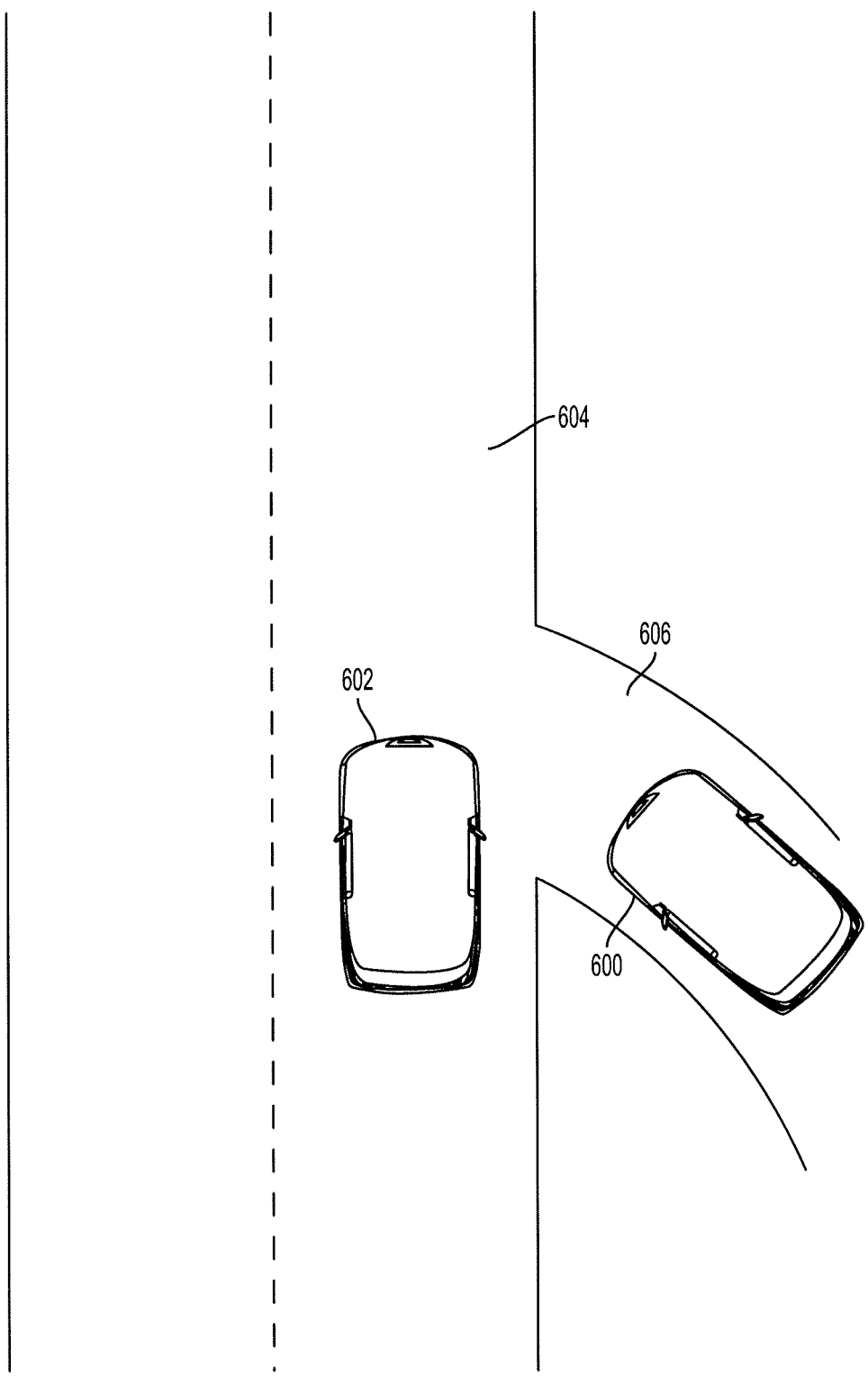
FIG. 6 is a drawing illustrating an exemplary implementation of the method of FIGS. 2A and 2B according to an embodiment of the present invention.

Referring now to FIG. 6, another exemplary implementation of the method 200 of FIGS. 2A and 2B is shown. In particular, a vehicle 600 may include lateral adaptive cruise control technology and may perform a method similar to the method 200 of FIGS. 2A and 2B. The vehicle 600 may be traveling along an on-ramp 606 at a speed similar to a second vehicle 502. The ECU may determine that the vehicle 600 will merge into a lane occupied by the vehicle 602 on a road 604 at a similar location at which the vehicle 602 is located.

Based on these determinations, the ECU of the vehicle 600 may determine that an ideal speed of the vehicle 600 is 10 mph less than a current vehicle speed to allow the vehicle 600 to safely merge onto the road 604 behind the vehicle 602. The ECU may then control the brake or the power source of the vehicle 600 to reduce the vehicle speed to 10 mph less than the current vehicle speed.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for lateral adaptive cruise control for use in a vehicle, the system comprising:
    a main body configured to support at least one driver;
    a power source configured to generate power to propel the main body along a roadway;
    a brake configured to apply a braking force to the main body;
    an input device configured to receive an adaptive cruise control request corresponding to a request for the vehicle to operate in an adaptive cruise control mode;
    an object sensor located on the main body and configured to detect lateral object data including data corresponding to at least one of a velocity of a lateral object or a relative distance to the lateral object, the lateral object being located at a lateral location relative to the main body, the object sensor including a camera configured to detect image data including a blinker status of the lateral object; and
    an electronic control unit (ECU) coupled to the power source, the input device, and the object sensor and programmed to:
        determine the at least one of the velocity of the lateral object or the relative distance to the lateral object based on the lateral object data,
        determine a lane entrance event corresponding to the lateral object traveling towards a current lane occupied by the main body based on the at least one of the velocity of the lateral object or the relative distance to the lateral object and based on the blinker status of the lateral object,
        control at least one of the power source or the brake to adjust a current speed of the main body based on the lane entrance event;
        determine a location of the lateral object relative to the main body based on the lateral object data;
        control the at least one of the power source or the brake to increase or decrease the current speed of the main body to prevent the lateral object from entering a location relative to the main body that is associated with a blind spot of the driver based on the location of the lateral object relative to the main body;
determine a lane end event indicating that the current lane occupied by the main body will be ending and that only one adjacent lane is available to be driven on; and
control the at least one of the power source or the brake to adjust the current speed of the main body based on the lateral object data to merge to the adjacent lane when the lane end event is determined.

2. The system of claim 1 wherein the ECU is further programmed to:
determine a lane change event corresponding to the main body being controlled to travel into a second lane adjacent to the current lane or the adjacent lane; and
control at least one of the power source or the brake to adjust the current speed of the main body based on the lane change event and the at least one of the velocity of the lateral object or the relative distance to the lateral object.

3. The system of claim 1 wherein the ECU is programmed to control the at least one of the power source or the brake to increase the current speed of the main body when the lane entrance event indicates that the lateral object is traveling to a location behind the main body, and to decrease the current speed of the main body when the lane entrance event indicates that the lateral object is traveling to a location in front of the main body.

4. The system of claim 3 wherein the object sensor is further configured to detect at least one of an additional velocity of a third vehicle in front of or behind the main body or an additional relative distance to the third vehicle, and the ECU is further programmed to determine whether to increase the current speed of the main body or to decrease the current speed of the main body based on the at least one of the additional velocity or the additional relative distance.

5. The system of claim 1 further comprising at least one of the camera or a global positioning sensor configured to detect location data, wherein the ECU is further programmed to determine an adjacent lane end event corresponding to the adjacent lane ending based on the at least one of the image data or the location data, and to determine the lane entrance event based on the adjacent lane end event.

6. The system of claim 1 wherein the ECU is further programmed to determine a size of the lateral object, and to determine the lane entrance event when the size of the lateral object is greater than or equal to a size threshold.

7. The system of claim 1 further comprising a speed sensor coupled to the ECU and configured to detect the current speed of the main body, wherein the ECU is further programmed to control the at least one of the power source or the brake based on the current speed of the main body.

8. The system of claim 1 wherein the ECU is further programmed to calculate an ideal speed of the main body based on the at least one of the velocity of the lateral object or the relative distance to the lateral object and the lane entrance event, and to control the at least one of the power source or the brake to cause the current speed of the main body to be equal to the ideal speed.

9. The system of claim 8 further comprising an output device configured to output data, wherein the ECU is further programmed to control the output device to output data requesting that at least one of acceleration or braking of the main body be controlled by a driver when the ECU is unable to calculate the ideal speed.

10. A system for lateral adaptive cruise control for use in a vehicle, the system comprising:
a main body configured to support at least one driver;
a power source configured to generate power to propel the main body along a roadway;
a brake configured to apply a braking force to the main body;
an input device configured to receive an adaptive cruise control request corresponding to a request for the vehicle to operate in an adaptive cruise control mode;
an object sensor located on the main body and configured to detect lateral object data including data corresponding to at least one of a velocity of a lateral object or a relative distance to the lateral object, the lateral object being located at a lateral location relative to the main body, the object sensor including a camera configured to detect image data corresponding to a speed limit sign; and
an electronic control unit (ECU) coupled to the power source, the input device, and the object sensor and programmed to:
determine the at least one of the velocity of the lateral object or the relative distance to the lateral object based on the lateral object data,
determine a lane change event corresponding to the main body being controlled to travel into a second lane adjacent to a current lane of the main body,
control at least one of the power source or the brake to adjust a current speed of the main body based on the lane change event and the at least one of the velocity of the lateral object or the relative distance to the lateral object,
determine a location of the lateral object relative to the main body based on the lateral object data,
determine a speed limit of a current roadway based on the image data,
control the at least one of the power source or the brake to increase or decrease the current speed of the main body to prevent the lateral object from entering a location relative to the main body that is associated with a blind spot of the at least one driver based on the location of the lateral object relative to the main body,
control the at least one of the power source or the brake to adjust the current speed of the main body to remain at or below the speed limit,
determine a lane end event indicating that the current lane occupied by the main body will be ending and that only the second lane adjacent to the current lane is available to be driven on, and
control the at least one of the power source or the brake to adjust the current speed of the main body based on the lateral object data to merge to the second lane adjacent to the current lane when the lane end event is determined.

11. The system of claim 10 further comprising at least one of the camera or a global positioning sensor configured to detect location data, wherein the ECU is further programmed to determine the lane end event corresponding to the current lane ending based on the at least one of the image data or the location data, and to determine the lane change event based on the lane end event.

12. The system of claim 10 further comprising a lane change input device configured to receive a user request to turn on a blinker of the main body, wherein the ECU is further programmed to determine the lane change event based on the user request to turn on the blinker of the main body.

13. The system of claim 10 wherein the ECU is further programmed to calculate an ideal speed of the main body based on the at least one of the velocity of the lateral object or the relative distance to the lateral object and the lane change event, and to control the at least one of the power source or the brake to cause the current speed of the main body to be equal to the ideal speed.

14. A method for lateral adaptive cruise control for use in a vehicle, the method comprising:
   receiving, by an input device, an adaptive cruise control request corresponding to a request for the vehicle to operate in an adaptive cruise control mode;
   detecting, by an object sensor located on a main body, lateral object data including data corresponding to at least one of a velocity of a lateral object or a relative distance to the lateral object, the lateral object being located at a lateral location relative to the main body;
   detecting, by a camera, image data including a blinker status of the lateral object;
   determining, by an electronic control unit (ECU), the at least one of the velocity of the lateral object or the relative distance to the lateral object based on the lateral object data;
   determining, by the ECU, a lane entrance event corresponding to the lateral object traveling towards a current lane occupied by the main body based on the at least one of the velocity of the lateral object or the relative distance to the lateral object and based on the blinker status of the lateral object;
   controlling, by the ECU, at least one of a power source or a brake to adjust a current speed of the main body based on the lane entrance event;
   determining, by the ECU, a location of the lateral object relative to the main body based on the lateral object data;
   controlling, by the ECU, the at least one of the power source or the brake to increase or decrease the current speed of the main body to prevent the lateral object from entering a location relative to the main body that is associated with a blind spot of a driver based on the location of the lateral object relative to the main body;
   determining, by the ECU, a lane end event indicating that the current lane occupied by the main body will be ending and that only one adjacent lane is available to be driven on; and
   controlling, by the ECU, the at least one of the power source or the brake to adjust the current speed of the main body based on the lateral object data to merge to the adjacent lane when the lane end event is determined.

15. The method of claim 14 further comprising:
   determining, by the ECU, a lane change event corresponding to the main body being controlled to travel into a second lane adjacent to the current lane or the adjacent lane; and
   controlling, by the ECU, at least one of the power source or the brake to adjust the current speed of the main body based on the lane change event and the at least one of the velocity of the lateral object or the relative distance to the lateral object.

16. The method of claim 14 further comprising:
   controlling, by the ECU, the at least one of the power source or the brake to increase the current speed of the main body when the lane entrance event indicates that the lateral object is traveling to a location behind the main body; and
   controlling, by the ECU, the at least one of the power source or the brake to decrease the current speed of the main body when the lane entrance event indicates that the lateral object is traveling to a location in front of the main body.

17. The method of claim 14 further comprising:
   detecting, by the object sensor, at least one of an additional velocity of a third vehicle in front of or behind the main body or an additional relative distance to the third vehicle; and
   determining, by the ECU, whether to increase the current speed of the main body or to decrease the current speed of the main body based on the at least one of the additional velocity or the additional relative distance.

* * * * *